(12) United States Patent
Maeda (10) Patent No.: US 7,475,669 B2
(45) Date of Patent: Jan. 13, 2009

(54) IGNITION CONTROL APPARATUS FOR AN ENGINE

(75) Inventor: Kazuyuki Maeda, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/572,437

(22) PCT Filed: Dec. 2, 2005

(86) PCT No.: PCT/IB2005/054035

§ 371 (c)(1), (2), (4) Date: Apr. 13, 2007

(87) PCT Pub. No.: WO2006/061758

PCT Pub. Date: Jun. 15, 2006

(65) Prior Publication Data

US 2007/0215100 A1 Sep. 20, 2007

(51) Int. Cl.
F02P 15/02 (2006.01)

(52) U.S. Cl. .................. 123/310; 123/406.11; 123/636; 123/638

(58) Field of Classification Search .................. 123/295, 123/636, 637, 638, 406.11, 635, 169 R, 169 EL, 123/169 MG
See application file for complete search history.

(56) References Cited

U.S. PATENT DOCUMENTS 6,935,302 B2* 8/2005 Kashiwagura et al. ...... 123/295
2002/0144672 A1* 10/2002 Hosoya ................. 123/406.27

FOREIGN PATENT DOCUMENTS

EP 1 406 003 4/2004

OTHER PUBLICATIONS

International Search Report PCT/IB2005/054035.

* cited by examiner

Primary Examiner—Stephen K Cronin
Assistant Examiner—Sizo B Vilakazi
(74) Attorney, Agent, or Firm—Global IP Counselors, LLP (57) ABSTRACT

An ignition control apparatus for an engine; in particular, an engine having two or more igniter plugs per cylinder energized by a electric power source, comprises a voltage detector for detecting a voltage of the electric power source, and a controller configured to effect initial combustion using both igniter plugs, to determine whether the voltage is lower than a first threshold voltage, and to effect further combustion using one of the igniter plugs when the voltage detected by the voltage detector is determined to be lower than the first threshold voltage.

18 Claims, 7 Drawing Sheets

IGNITION CONTROL APPARATUS FOR AN ENGINE

RELATED APPLICATION

The disclosure of Japanese Patent Application No. 2004-352804, filed Dec. 6, 2004, including its specification, drawings and claims, is incorporated herein by reference in its entirety.

FIELD

Described herein is an ignition control apparatus for an engine; in particular, an engine having two or more igniter plugs per cylinder.

BACKGROUND

Two igniter plugs may be provided in a combustion chamber in order to alternate between one-point ignition and two-point ignition. Th1s technology is applied to, for example, a direct-injection engine in which the combustion chamber is provided with a fuel injection valve, whereby under low-load conditions, stratification combustion is effected by energizing an igniter plug provided to the combustion chamber in order to improve energy efficiency, and under high-load conditions, this is switched to homogeneous combustion in order to obtain high output. At the same time, EGR (Exhaust Gas Recirculation) is effected in order to reduce the $NO_x$ generated largely under high-load conditions. EGR reduces the rapidity of combustion, thereby reducing combustion efficiency. Reduction of the rapidity of combustion in the EGR environment is offset by energizing another igniter plug in addition to the first-mentioned igniter plug.

In the case of ignition at two or more points as described above, a first igniter plug can be provided at the center of the combustion chamber and a second igniter plug can be provided at a location other than the center of the combustion chamber. When ignition is effected by using these two or more igniter plugs, the rapidity of combustion can be increased and energy efficiency can be improved.

SUMMARY OF THE INVENTION

Studies of spark-ignition engines that perform two-point ignition have shown that once flame extinction (misfire) occurs, unburned HC is exhausted during a period of delay for recovering from the misfire condition, and therefore it is desirable to take precautionary measures against misfire.

Specifically, the present ignition control apparatus is applicable to an engine in which the first and second igniter plugs are energized by a electric power source, and comprises a voltage detector that detects the voltage of the electric power source, a controller configured to effect initial combustion by the first and second igniter plugs, to determine whether the voltage is lower than a first threshold voltage, and when it is, to effect further combustion using one of the igniter plugs.

BRIEF DESCRIPTION OF THE DRAWINGS

For a more complete understanding of the present ignition control apparatus for an engine, and the advantages thereof, reference is now made to the following description taken in conjunction with the accompanying drawings, in which.

DETAILED DESCRIPTION OF THE ILLUSTRATED EMBODIMENTS

A description will now be given, referring to embodiments of the present apparatus. While the claims are not limited to such embodiments, an appreciation of various aspects of the apparatus is best gained through a discussion of various examples thereof.

Figure 1:
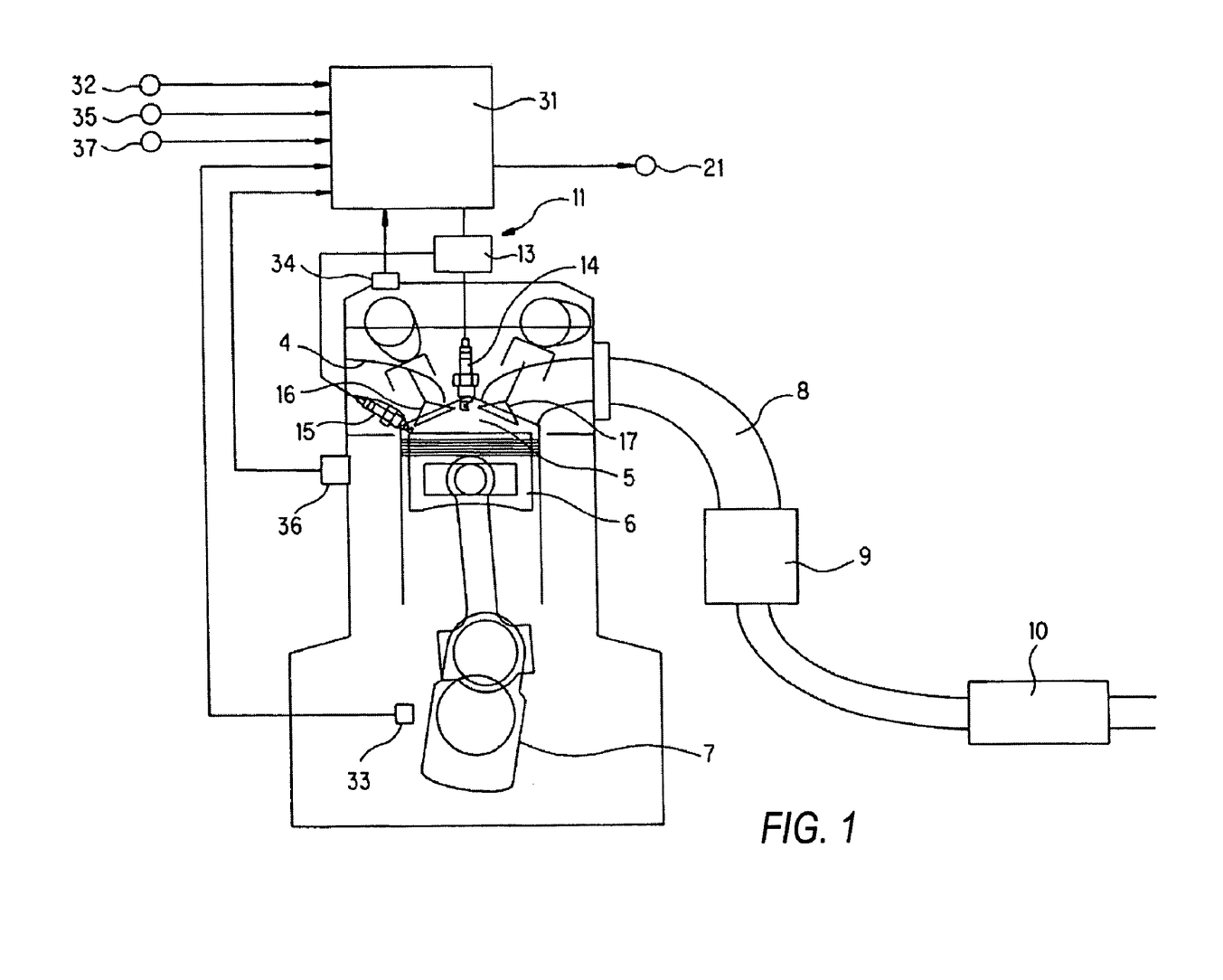
FIG. 1 is a schematic elevational view of an engine according to a first embodiment.
Figure 2:
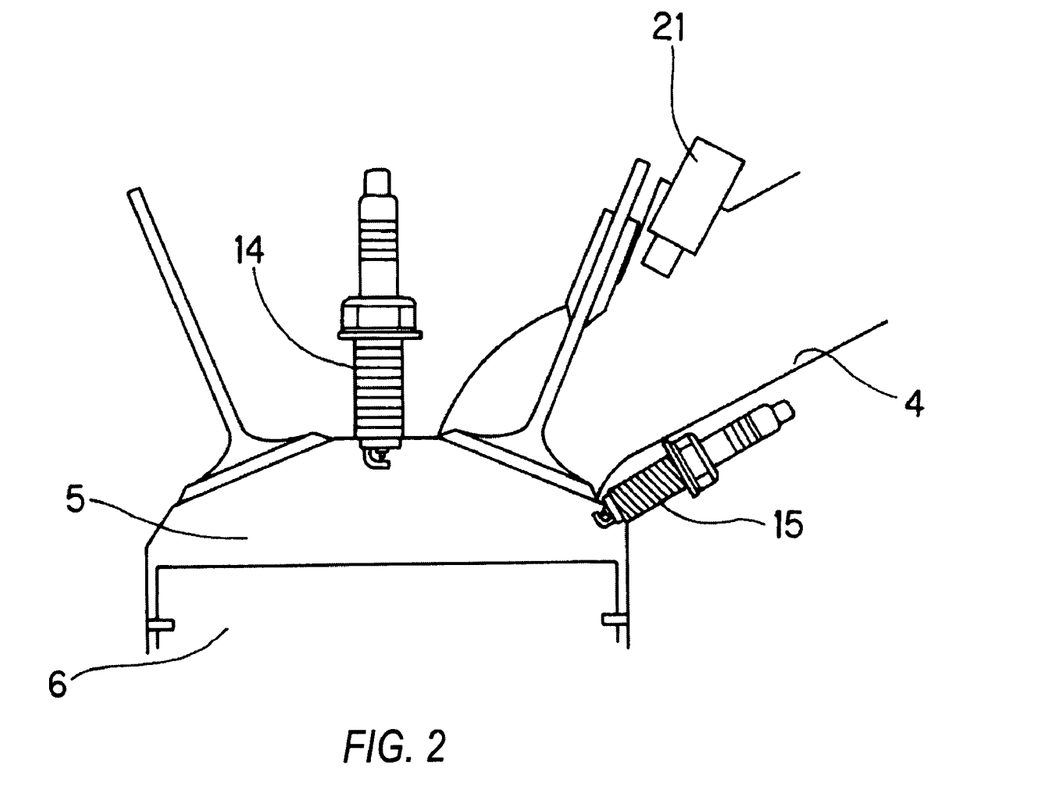
FIG. 2 is a partial schematic elevational view of a combustion chamber of the engine of FIG. 1.

Referring to FIG. 1, air is gathered in an inlet collector (not shown) and then introduced to a combustion chamber 5 of each cylinder via an inlet manifold (not shown). Referring to FIG. 2, the fuel is supplied and injected by means of a fuel injector 21 arranged at an inlet port 4 of each cylinder.

An exhaust passage 8 passes through three-way catalysts 9 and 10 so that harmful elements contained in the exhaust, such as HC, CO and $NO_x$ can be efficiently removed at once, when the air-fuel ratio is within a narrow range or window having the theoretically optimum air-fuel ratio as its center. The air-fuel ratio is the ratio of the volume of intake air and the volume of fuel. An engine controller 31 determines the amount of fuel injected by the fuel injector 21 based on a signal from an air flow meter 32 representing intake air flow volume and a signal from crank angle sensors (33, 34), so that during each cycle of the engine the ratio of the volume of intake air introduced to the combustion chamber 5 and the volume of fuel injected by the fuel injector 21 will conform to the theoretically optimum air-fuel ratio.

The fuel injected into the intake air is vaporized while being mixed with the air to create a gas (fuel-air mixture) to flow into the combustion chamber 5. Th1s fuel-air mixture is confined in the combustion chamber 5 when a pair of intake valves 16 is closed, and is compressed by raising a piston 6.

An ignition apparatus 11 having an electronic power distribution system in which an ignition coil 13 having a built-in power transistor (not shown) is provided in each cylinder to ignite the compressed fuel-air mixture using a high-voltage spark. That is, the ignition apparatus 11 comprises the ignition coil 13 for accumulating electrical energy from a battery, the power transistor for effecting power distribution to the ignition coil 13 and power cut-off thereof on the primary side of the coil, and two igniter plugs 14 and 15 for effecting spark discharge using the high voltage generated on the secondary side of the ignition coil 13 when the first electric current of the ignition coil 13 is interrupted.

Figure 3:
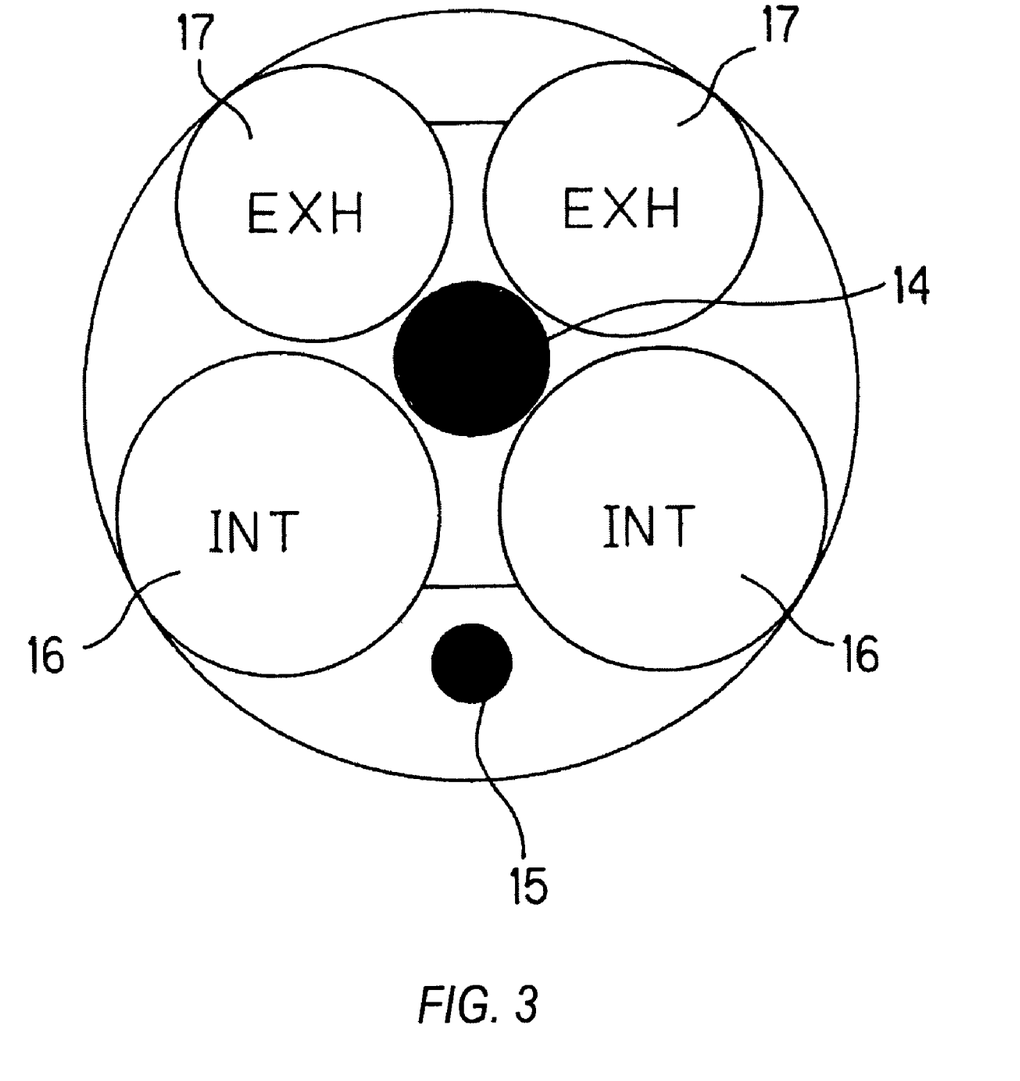
FIG. 3 is a schematic bottom plan view of the combustion chamber of FIG. 2.

In this case, as shown in FIG. 3, the main plug 14 (the first igniter plug) is provided approximately at the center of the ceiling of the combustion chamber 5 and the sub-plug (the second igniter plug) is provided at a location closer to the inlet side of the combustion chamber 5. The sub-plug 15 is so provided as to be spaced from the position of the main plug 14.

Figure 7A:
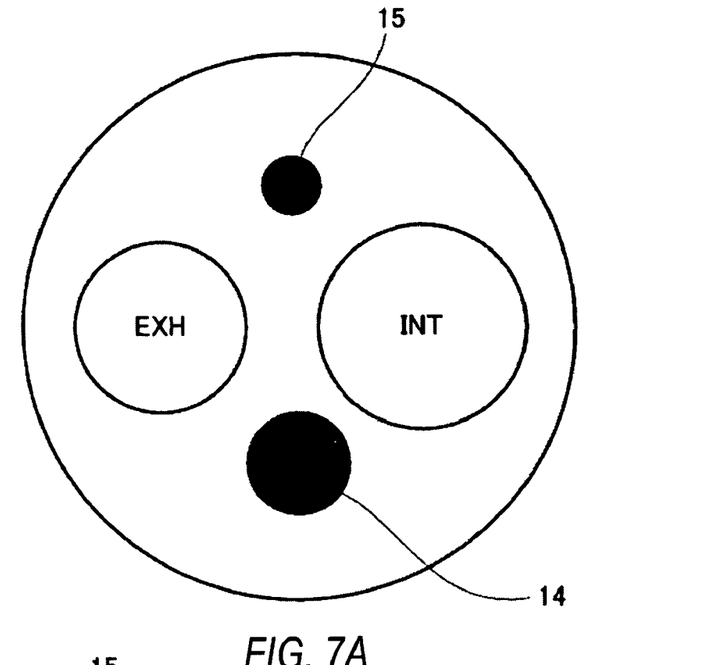
FIG. 7A is a schematic bottom plan view of a combustion chamber of an engine according to another embodiment.
Figure 7B:
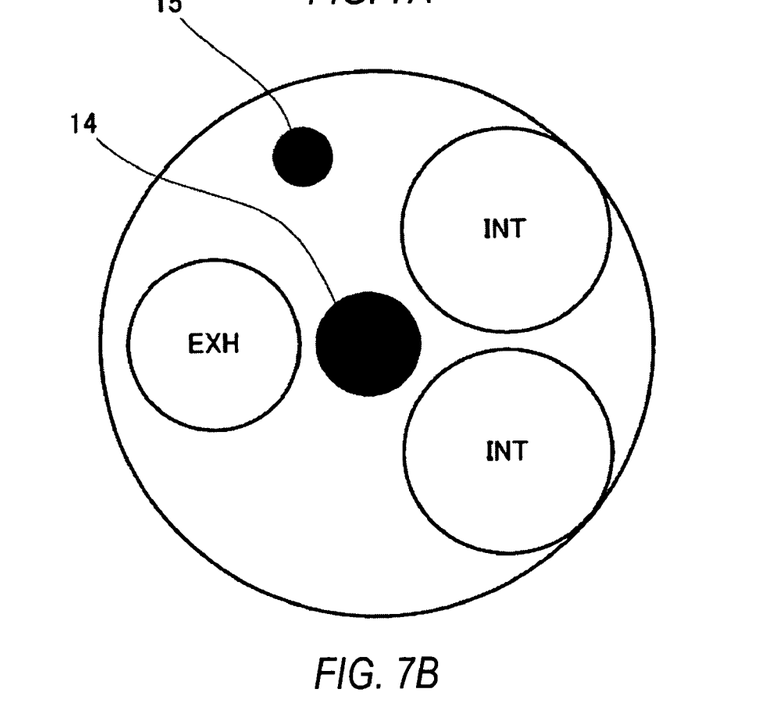
FIG. 7B is a schematic bottom plan view of a combustion chamber of an engine according to still another embodiment.

In FIG. 3, although the sizes of main plug and sub-plug shown by black discs "●" are different, the specifications for the main plug 14 and sub-plug 15 are identical or similar to each other. The number and arrangement of the inlet and exhaust valves INT and EXH, and the locations of the igniter plugs are not limited to what is shown, and also may be arranged, for example, as shown in FIGS. 7A and 7B.

When sparks are provided by the two igniter plugs 14 and 15, briefly before the piston 6 reaches its upper or compression dead center, to ignite the compressed fuel-air mixture in the combustion chamber 5, the flame expands and then is explosively combusted, and the piston 6 is forced downwardly by the gas pressure due to combustion. This work is extracted as the rotational power of the crank shaft 7. After combustion the gas is discharged to the exhaust passage 8 when the two exhausts valves 17 are opened.

Upon ignition, the main plug 14 and the sub-plug 15 are energized at the same time throughout the entire driving range, excluding the driving range in which knocking, described below, is apt to be generated. By doing so, combustion of the fuel-air mixture in the combustion chamber 5 is accelerated and therefore the output of the engine is increased.

The ignition timing for optimum fuel efficiency is predetermined as basic ignition timing ADV0. The engine controller 31 calculates the basic ignition timing ADV0 according to the driving condition (engine load and rotational speed). When the actual crank angle is conformed to the ignition timing ADV0, the engine controller 31 interrupts the primary side current of the igniter plug 14 via the power transistor, thereby controlling the ignition timing.

In the high-load/low-rotation speed range, knocking is easily generated. Therefore, the engine controller 31 performs knock control based on a knock sensor 36. The knock control, when two igniter plugs 14 and 15 are employed, is the same as the knock control when only a single igniter plug 14 is employed. That is, when the knock intensity detected by the knock sensor 36 exceeds a predetermined value, ignition is effected at timing in which the basic ignition timing ADV0 [°BTDC] is delayed in steps by a certain amount of lag RTD [°], as the control ignition timing QADV [°BTDC], and if the knock intensity is equal to or below the predetermined value, then a certain amount of advance is gradually added. That is, ignition is effected using ignition timing that is gradually returned to the advance side, as the control ignition timing QADV. If the knock intensity exceeds the predetermined value again due to advancement of the ignition timing, ignition is effected with the control ignition timing QADV delayed in steps by a certain amount of lag RTD, as the control ignition timing QADV. If the knock intensity is equal to or below the predetermined value with such a lag, then ignition is effected using ignition timing that is gradually returned to the advance side, as the control ignition timing QADV. The foregoing operation is then repeated.

During ignition in the high-load/low-rotation speed range, the main plug 14 is energized first, then the sub plug 15 is energized so that the rapidity of combustion during initial combustion of the fuel-air mixture becomes moderate, thereby preventing knocking.

It was discovered from experiments that when the battery voltage is below a predetermined threshold value, the electrical energy accumulated in the ignition coil 13 is insufficient, and in such a case, if two-point ignition of two igniter plugs 14 and 15 is effected, flame-extinction may result. Such a misfire becomes substantial when a single coil 13 provides ignition energy for the two igniter plugs 14 and 15. Since the cause of the misfire is the lack of electrical energy, an ignition coil may be provided for each igniter plug. However, cost would thereby be increased because of the additional parts.

On the other hand, it has been discovered that even if the battery voltage is below the predetermined threshold value, the single coil 13 is sufficient to accumulate ignition energy for one igniter plug, and therefore it is possible to ignite without causing a misfire. In addition, ignition using only the main plug 14 is no different from conventional ignition in a one-point spark-ignition engine.

Therefore, it is to be determined whether or not the battery voltage falls below the predetermined threshold. Based on the result, if the battery voltage is below the predetermined threshold, the ignition is switched from two-point ignition using the two igniter plugs 14 and 15 to one-point ignition using only the main plug 14.

The battery voltage may be below the predetermined threshold value either because of deterioration of the battery or because of temporary reduction of the battery voltage caused by multiple electrical loads drawing from the same battery as a power source. Treatment should be different depending on the cause of low battery voltage. That is, when the battery voltage is below the predetermined threshold value because of deterioration of the battery, one-point ignition using only the main plug 14 is continued until the battery is replaced with a new one, while, when it is due to temporary reduction of the battery voltage, two-point ignition is resumed when the battery voltage has recovered to the predetermined threshold value.

Figure 4A:
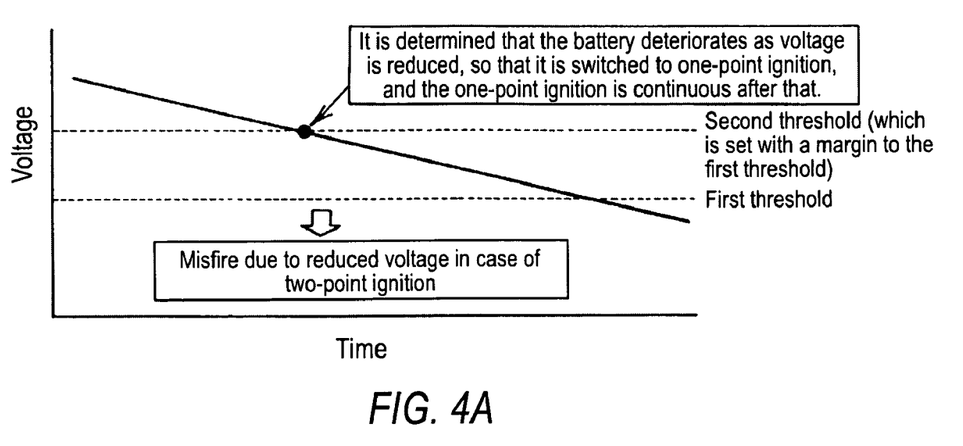
FIGS. 4A and 4B are waveform charts of battery voltage.
Figure 4B:
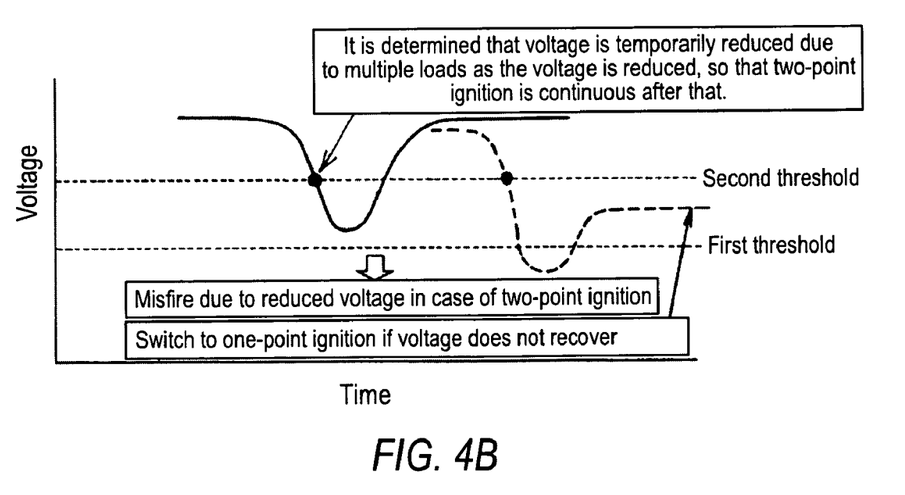

FIGS. 4A and 4B show the temporal transition of the battery voltage as a model. In these figures, two thresholds Th1 and Th2 are established. The first threshold value Th1 (one example of the lower threshold voltage) is the battery voltage that actually generates a misfire because, when the battery voltage is below this first threshold Th1, the single ignition coil 13 cannot accumulate enough ignition energy to effect two-point ignition using the two igniter plugs 14 and 15. The second threshold Th2 (one example of the prescribed threshold voltage) is one in which a margin has been added to the first threshold value Th1.

FIG. 4A shows the condition in which the battery voltage has gradually been reduced. This is the case of voltage reduction due to deterioration of the battery. In this case, since the battery voltage is not expected to recover to the second threshold value Th2, two-point ignition is cancelled immediately and switched to one-point ignition using only the main plug 14 and such one-point ignition is continuous after that.

The solid line in FIG. 4B represents the condition in which the battery voltage is temporarily reduced. This is the case of temporary voltage reduction because of multiple electrical loads (auxiliary equipment loads) drawing from the battery as a power source all at the same time. In this case, the battery has not deteriorated, and the battery voltage VB is expected to recover to a value that exceeds the second threshold value Th2 by inactivating one or all of the additional electrical loads, and therefore, operation of two-point ignition using the two igniter plugs 14 and 15 is continued.

However, as shown as a broken line in FIG. 4B, when the battery voltage goes below the first threshold Th1 and then does not recover to the second threshold value Th2, the condition is treated in the same way as a voltage reduction due to battery deterioration. That is, two-point ignition is immediately cancelled and the ignition is switched to one-point ignition using only the main plug 14, so that such one-point ignition is thenceforth continuous.

As described above, by focusing on the cause of reduction of the battery voltage; that is, by determining whether the battery has deteriorated or whether it is a temporary reduction of the battery voltage, ignition control is effected based on the result.

This control executed by the engine controller 31 is described below in detail by referring to the flowchart where the steps discussed below are represented by "S" followed by the step number in the relevant figure.

Figure 5:
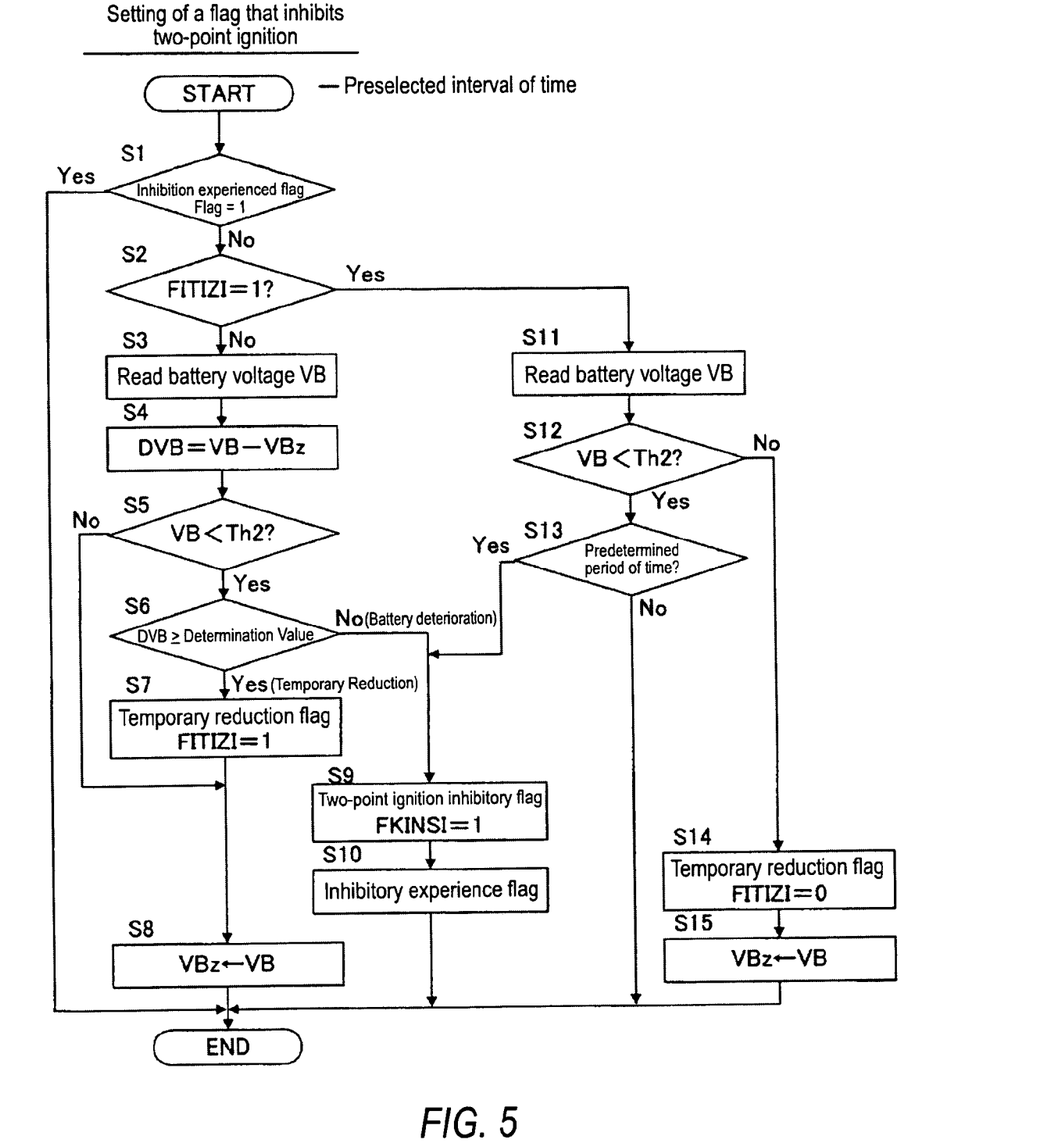
FIG. 5 is a flowchart showing setting of a flag that inhibits two-point ignition.

FIG. 5 shows a setting of a flag for inhibiting two-point ignition, and the process is executed at every preselected interval of time (for example, every 10 msec).

In Steps 1 and 2, an inhibition experienced flag and a temporary reduction flag FITIZI are checked. The temporary reduction flag FITIZI (default is 0) is set as FITIZI=1 when a temporary reduction of the battery voltage occurs.

As described below, the inhibition experienced flag (default is 0) is set to one (1) when the battery has deteriorated, or when temporary reduction of the battery voltage occurs, and the battery voltage does not recover to the second threshold value.

In the case in which the inhibition experienced flag is zero (0) and the temporary reduction flag FITIZI is zero (0), in Step 3, the battery voltage VB, which is detected by the voltage sensor 37 (battery voltage detection unit), is read. In Step 4, the reduction of the battery voltage VB per a predetermined period of time, in other words, the rate of voltage reduction is calculated using the formula (1) set forth below.

$$DVB=VB-VBz. \quad (1)$$

VBz: previous VB value

In FIG. 5, since the control cycle of the flow is brief, such as 10 msec, the rate of the voltage reduction in formula (1) is approximately per 10 msec. If this is too brief, the control cycle may be made longer.

In Step 5, the battery voltage VB and the second threshold value Th2 are compared. The second threshold value Th2 is, as described above, a battery voltage in which a margin has been added to the first threshold value Th1.

When the battery voltage VB is equal to or greater than the second threshold value Th2, since the battery has not deteriorated, the battery voltage VB is changed to VBz at Step 8 and the process is completed.

Since the battery voltage VB becomes lower than the second threshold value Th2 either due to battery deterioration or temporary reduction of the battery voltage, in order to determine which of the two is the cause, the voltage reduction rate DVB and the determination results are compared at Step 6. The above-mentioned second threshold value Th2 and these determination results vary depending on engine type, and therefore they may be set through adjustment.

When the battery voltage VB is lower than the second threshold value Th2 and the voltage reduction rate DVB is lower than the predetermined value, it is deemed to be a voltage reduction due to deterioration of the battery, and the process moves from Steps 5 and 6 to Step 9, so that the two-point ignition inhibitory flag is changed to FKINSI=1, and then at Step 10, the inhibitory experience flag is set to one (1), and the process is completed.

With this two-point ignition inhibitory flag FKINSI=1, as described below, two-point ignition using the two igniter plugs 14 and 15 is inhibited and the ignition is switched to one-point ignition using only the main plug 14.

In addition, if it is determined that voltage reduction is due to battery deterioration, according to the inhibitory experienced flag=1, it cannot proceed to Step 2 at the next instance. The reason why the inhibitory experienced flag is set to one (1) when it is determined that the battery has deteriorated, is that, since it is impossible for the battery voltage VB to recover to the second threshold value Th2, there is no need to return the two-point ignition inhibitory flag to zero (0) until the battery has been replaced by a new one. That is, there is no need to advance to Step 2 then or later. The state of the inhibitory experienced flag=1 is stored in a nonvolatile memory after the engine is turned off.

When the battery voltage VB is lower than the second threshold value Th2 and the voltage reduction rate DVB is equal to or greater than the predetermined value, it is determined that temporary reduction of the battery voltage has occurred, the process proceeds from Steps 5 and 6 to Step 7, the temporary reduction flag FITIZI (default is zero) is set to one (1), and operation in Step 8 is effected and the process completed.

As described above, when it is determined that temporary reduction of the battery voltage has been effected, the inhibitory experience flag is not set to one (1) and therefore the process proceeds from Steps 1 and 2 to Step 11 and steps thereafter, at the next instance.

At Step 11, the battery voltage VB detected by the voltage sensor 37 is read, and at Step 12, this battery voltage VB and the second threshold value Th2 are compared. This is to determine whether or not the battery voltage VB has recovered to a value that exceeds the second threshold value Th2, after the battery voltage is determined to be temporarily reduced.

When the battery voltage VB becomes equal to or greater than the second threshold value Th2, due to inactivation of the electrical load, the battery voltage VB is deemed to have recovered and the process proceeds from Step 12 to Step 14. The temporary reduction flag is set to FITIZI=0, and then at Step 15, the battery voltage VB at this time is transferred to VBz, and the process is completed.

In the case of the temporary reduction flag FITIZI=0, the process advances from Steps 1 and 2 to Step 3 and the following steps during the next instance, and it is determined whether or not the battery has deteriorated, or whether or not temporary reduction of the battery voltage has occurred. Based on the result, the above-mentioned ignition control is effected.

When the battery voltage VB is lower than the second threshold value Th2, then the process advances from Step 12 to Step 13, so that it is determined whether or not the state in which the battery voltage VB is lower than the second threshold value Th2 has continued for a predetermined period of time. The value that can be identified as voltage reduction due to battery deterioration should be set as the predetermined time by adjustment.

When the state in which the battery voltage VB is lower than the second threshold value Th2 continuously within the predetermined period of time, then it is determined that an electrical load has significantly consumed the battery capacity and it is not at the stage in which the battery voltage VB has recovered, and therefore the process is terminated.

On the contrary, when the state in which the battery voltage VB is lower than the second threshold value Th2 continues for the predetermined period of time or longer, it is determined that the battery voltage VB will not recover to the second threshold value Th2, whereby the condition is treated in the same way as that of voltage reduction due to deterioration of the battery. The process proceeds from Steps 12 and 13 to Steps 9 and 10, the two-point ignition inhibitory flag is set to be FKINSI=1, and the inhibitory experienced flag is set to 1 and the process terminated.

As described above, the case in which the battery voltage VB does not recover to the second threshold value Th2 includes the case in which the battery voltage VB falls below the first threshold value Th1, as shown in FIG. 4B.

Figure 6:
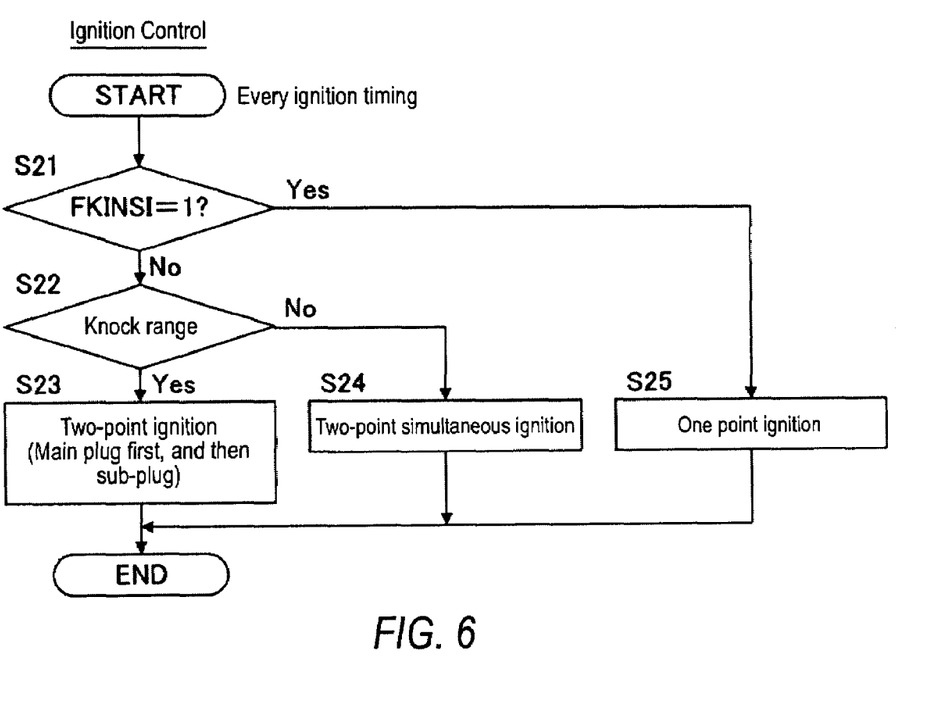
FIG. 6 is a flowchart showing ignition control.

FIG. 6 is a flowchart of the ignition control, wherein the process is performed with every ignition timing.

At Step 21, the two-point ignition inhibitory flag FKINSI set in FIG. 5 is observed. In the case in which the two-point ignition inhibitory flag FKINSI=0, the process proceeds to Steps 22 to 24. Steps 22 to 24 are the same as conventional operation. That is, at Step 22, whether or not the engine is in the knock range (for example, a high-load/low rotation speed range) is observed. When it is in the knock range, the process proceeds to Step 23, and the main plug 14 is energized first, and then sub-plug 15 is energized so that knocking can be prevented. When it is not in the knock range, then the process proceeds from Step 22 to Step 24 and two-point simultaneous ignition is effected.

When temporary reduction of the battery voltage VB occurs and the battery voltage VB later recovers to the second threshold value, the process proceeds from Step 21 to Step 22 and two-point ignition is effected since the two-point ignition inhibitory flag does not become FKINSI=1.

In the case in which the two-point ignition inhibitory flag becomes FKINSI=1, the battery has deteriorated or temporary reduction of the battery voltage VB has occurred, and at the same time the battery voltage VB does not recover to the second threshold value Th2, the process proceeds from Step 21 to Step 25 and one-point ignition using only the main plug 14 is executed.

In the present apparatus, since it is switched from two-point ignition using two igniter plugs 14 and 15 to one-point ignition using only the main plug 14 when the battery voltage is reduced, it is enough for single ignition coil 13 to accumulate the ignition energy for one igniter plug, and therefore, a misfire can be prevented even if the battery voltage is lower than the second threshold value Th2 (ignition capability is maintained.).

At that time, even if ignition by the sub-plug 15 is cancelled, the ignition condition is the same as in a conventional one-point spark ignition engine, and therefore engine performance is not greatly affected.

In the present apparatus, since the second threshold value Th2 is a battery voltage in which a margin has been added to the first threshold value Th1, which is the voltage at which a misfire occurs, when two-point ignition using two igniter plugs 14 and 15 is effected, ignition can be switched to one-point ignition in a state in which there is some delay before a misfire occurs, so that it is possible to securely prevent the misfire.

When the battery voltage VB is lower than the second threshold value Th2 and at the same time the rate of reduction of the battery voltage DVB is lower than the predetermined value, it means the battery has deteriorated, whereby the battery voltage is not expected to recover to the second threshold value Th2 or greater. Therefore, when the battery voltage VB is lower than the second threshold value Th2 and the rate of reduction of the battery voltage DVB is lower than the predetermined value, since, in the present apparatus, the ignition is switched from two-point ignition to one-point ignition using only the main plug 14, even if the battery has deteriorated a misfire is securely prevented.

When the battery voltage VB is lower than the second threshold value Th2, and the rate of reduction of the battery voltage DVB is equal to or greater than the predetermined value, and after that the battery voltage has not recovered to the second threshold value Th2, the condition can be considered to be identical to battery deterioration even if it is a temporary reduction of the battery voltage. Therefore, when the battery voltage is lower than the second threshold value Th2, the speed of reduction of the battery voltage is equal to or greater than the determination value, and the battery voltage VB has not recovered to the second threshold value Th2, since in the present apparatus the ignition is switched from two-point ignition to one-point ignition, it is possible to securely prevent a misfire even when the condition can be identified as battery deterioration.

The above mentioned can be applied appropriately also to the system in which two ignition coils are respectively provided for two igniter plugs though the embodiment is the system in which the one ignition coil is provided for two igniter plugs. In addition, the above mentioned can be applied to the electric power sources other than the battery, for instance, the alternator. When the alternator does not operates normally, the ignition control is effected based on the voltage of the alternator.

What is claimed is:

1. An ignition control apparatus for an engine comprising:
   an electric power source;
   a first igniter plug in a combustion chamber, the first igniter plug being energized by the electric power source;
   a second igniter plug in a combustion chamber, the second igniter plug being energized by the electric power source;
   a voltage detector for detecting a voltage of the electric power source; and
   a controller configured to effect initial combustion by the first and second igniter plugs, to determine whether the voltage is lower than a prescribed threshold voltage, and to effect further combustion by using one of the igniter plugs when the voltage detected by the voltage detector is lower than the prescribed threshold voltage,
   the controller being further configured to detect a rate of reduction of the voltage, to determine whether the rate of reduction of the voltage is lower than a predetermined threshold rate, and to effect further combustion using one of the igniter plugs when the voltage is lower than the prescribed threshold voltage and the rate of reduction of the voltage is lower than the predetermined threshold rate.

2. The ignition control apparatus according to claim 1, wherein
   the prescribed threshold voltage is so determined that the initial combustion does not cause misfire.

3. The ignition control apparatus according to claim 1, wherein
   the controller is further configured to determine whether the voltage is lower than a lower threshold voltage lower than the prescribed threshold voltage, and to effect the further combustion using one of the igniter plugs when the voltage is determined to be lower than the lower threshold voltage.

4. An internal combustion engine equipped with the ignition control apparatus according to claim 1.

5. The ignition control apparatus according to claim 1, wherein
   the first igniter plug is located approximately at a center of the combustion chamber in plan view, and the second igniter plug is located at a peripheral portion surrounding the first igniter plug in plan view, wherein the first igniter is used when the further combustion is effected.

6. The ignition control apparatus according to claim 5, wherein
   the prescribed threshold voltage is equivalent to an electric power source voltage calculated by adding a margin to the voltage at which the initial combustion may cause a misfire.

7. The ignition control apparatus according to claim 1, wherein
the prescribed threshold voltage is equivalent to an electric power source voltage calculated by adding a margin to the voltage at which the initial combustion starts misfiring.

8. The ignition control apparatus according to claim 7, wherein
the first igniter plug is located approximately at a center of the combustion chamber in plan view, and the second igniter plug is located at a peripheral portion surrounding the first igniter plug in plan view, wherein the first igniter is used when the further combustion is effected.

9. The ignition control apparatus according to claim 1, wherein
the controller is further configured to measure an elapsed time during which the voltage remains lower than the prescribed threshold voltage, to determine whether the elapsed time is greater than a predetermined threshold time, and to effect the further combustion using one of the igniter plugs when the elapsed time is determined to be greater than the predetermined threshold time.

10. The ignition control apparatus according to claim 9, wherein
the controller is further configured to determine whether the voltage is lower than a lower threshold voltage lower than the prescribed threshold voltage, and to effect the further combustion using one of the igniter plugs when the voltage is determined to be lower than the lower threshold voltage.

11. The ignition control apparatus according to claim 9, wherein the prescribed threshold voltage is equivalent to an electric power source voltage calculated by adding a margin to the voltage at which the initial combustion starts misfiring.

12. The ignition control apparatus according to claim 9, wherein
the first igniter plug is located approximately at a center of the combustion chamber in plan view, and the second igniter plug is located at a peripheral portion surrounding the first igniter plug in plan view, wherein the first igniter is used when the further combustion is effected.

13. An ignition control apparatus for an engine comprising:
an electric power source;
a first igniter plug in a combustion chamber, the first igniter plug being energized by the electric power source;
a second igniter plug in a combustion chamber, the second igniter plug being energized by the electric power source;
a voltage detector for detecting a voltage of the electric power source; and
a controller configured to effect initial combustion by the first and second igniter plugs, to determine whether the voltage is lower than a prescribed threshold voltage, and to effect further combustion by using one of the igniter plugs when the voltage detected by the voltage detector is lower than the prescribed threshold voltage,
the controller being further configured to measure an elapsed time during which the voltage remains lower than the prescribed threshold voltage, to determine whether the elapsed time is greater than a predetermined threshold time, and to effect the further combustion using one of the igniter plugs when the elapsed time is determined to be greater than the predetermined threshold time.

14. The ignition control apparatus according to claim 13, wherein
the controller is further configured to determine whether the voltage is lower than a lower threshold voltage lower than the prescribed threshold voltage, and to effect the further combustion using one of the igniter plugs when the voltage is determined to be lower than the lower threshold voltage.

15. The ignition control apparatus according to claim 13, wherein
the prescribed threshold voltage is equivalent to an electric power source voltage calculated by adding a margin to the voltage at which the initial combustion starts misfiring.

16. The ignition control apparatus according to claim 13, wherein
the first igniter plug is located approximately at a center of the combustion chamber in plan view, and the second igniter plug is located at a peripheral portion surrounding the first igniter plug in plan view, wherein the first igniter is used when the further combustion is effected.

17. A method of controlling ignition for an internal combustion engine having a first igniter plug and a second igniter plug in a combustion chamber, the first and second igniter plugs being energized by an electric power source, comprising:
detecting a voltage of the electric power source;
effecting initial combustion using the first and second igniter plugs;
determining whether the voltage is lower than a prescribed threshold voltage;
effecting further combustion using one of the igniter plugs when the voltage is determined to be lower than the prescribed threshold voltage;
detecting a rate of reduction of the voltage;
determining whether the rate of reduction of the voltage is lower than a predetermined threshold rate; and
effecting further combustion using one of the igniter plugs when the voltage is lower than the prescribed threshold voltage and the rate of reduction of the voltage is lower than the predetermined threshold rate.

18. The method of controlling ignition for the internal combustion engine according to claim 17, further comprising:
locating the first igniter plug approximately at a center of the combustion chamber in plan view,
locating the second igniter plug at a peripheral portion surrounding the first igniter plug in plan view, and
using the first igniter when the further combustion is effected.

* * * * *